May 17, 1966
J. W. LUNDSTROM
3,252,086
ELECTRICAL APPARATUS FOR DETERMINING MOISTURE CONTENT
BY MEASUREMENT OF DIELECTRIC LOSS UTILIZING AN
OSCILLATOR HAVING A RESONANT TANK CIRCUIT
Filed July 16, 1962
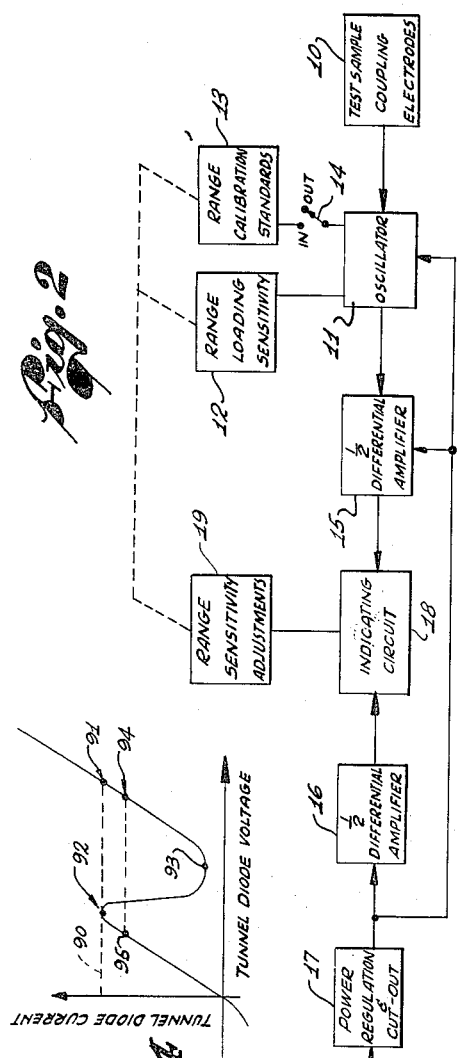
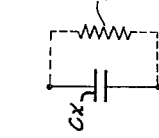
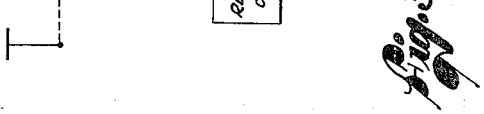
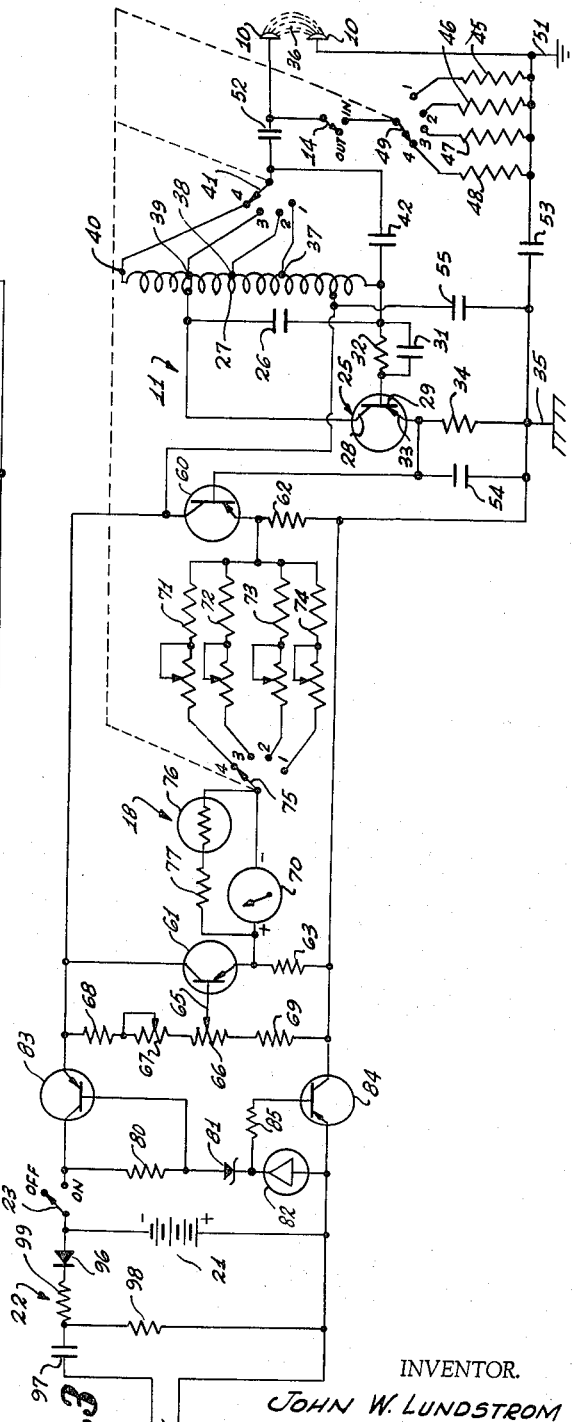
INVENTOR.
JOHN W. LUNDSTROM
BY Forrest J. Lilly
ATTORNEY

United States Patent Office 3,252,086
Patented May 17, 1966

3,252,086
ELECTRICAL APPARATUS FOR DETERMINING MOISTURE CONTENT BY MEASUREMENT OF DIELECTRIC LOSS UTILIZING AN OSCILLATOR HAVING A RESONANT TANK CIRCUIT
John W. Lundstrom, Glendora, Calif., assignor to Moisture Register Company, Alhambra, Calif., a corporation of California
Filed July 16, 1962, Ser. No. 209,916
9 Claims. (Cl. 324—61)

This invention relates generally to systems for measuring the moisture content of various materials and, more particularly, to a new and improved electronic device for accurately measuring the moisture content of samples from a large group of different materials, and over a wide range of moisture content variation, as a function of the dielectric loss or dissipation factor of the materials being tested.

Measurement of the moisture content of materials has in the past generally been accomplished by a number of methods of both the chemical and electronic variety. In this regard, electronic moisture measurement methods have been preferred over the chemical variety from the point of view of ease and rapidity of measurement, as well as the fact that electronic testing is non-destructive of the material being tested.

The electronic moisture measurement devices have generally been of three types, measuring moisture as a function of D.C. resistance, as a function of the dielectric constant, or as a function of dielectric power loss in the test sample. The latter method is generally preferred, since the D.C. resistance measuring devices frequently suffer from a lack of sensitivity and inaccuracy in the low moisture percentage regions. Moreover, the performance of power loss sensitive devices has proven superior to dielectric constant sensitive systems for a number of different materials over certain selected moisture ranges.

Electronic devices employing the dielectric power loss approach for measuring moisture content of samples under test usually make use of current indicating circuits which are responsive to variations of this parameter in an oscillator circuit being loaded by the material being tested. Unfortunately, this approach to moisture measurement introduces a number of problems which have long plagued the designers of such instruments.

In this regard, the dielectric power loss in different materials, for the same moisture content percentage, may vary over an extremely wide range. Hence, a number of different instruments have in the past been required where moisture content was to be measured for a number of different materials. Moreover, for materials displaying a relatively small change in dielectric power loss for a corresponding large change in moisture content, the measurement systems of the prior art have suffered from inadequate sensitivity. On the other hand, such instruments frequently prove too sensitive, and are prone to overloading, when used to register moisture content for extremely lossy materials.

Another problem confronting designers of dissipation factor measurement systems has been the sensitivity of such systems to variation in the capacitance of the sample as well as to its dielectric power loss. Since the relationship between test sample capacitance and test sample moisture content is not the same as that between the latter parameter and dielectric power loss, inaccuracies are inherently introduced into power loss measuring devices which are also sensitive to sample capacitance. Hence, those concerned with the development of such measuring devices have long recognized the need for a system possessing adequate sensitivity to variations in dielectric power loss of a test sample, while being relatively insensitive to variations in capacitance.

Among the additional problems encountered with prior moisture measurement instrumentation has been the lack of compactness of the devices available, the sensitivity of the instruments to power supply voltage variations, the difficulty of establishing and maintaining accurate instrument calibration, the difficulty in adapting an instrument designed for the measurement of moisture content in one material to the measurement of moisture content in a different material, and the expense of manufacture and maintenance of the instrumentation.

Accordingly, it is an object of the present invention to provide a new and improved moisture measurement system which overcomes the above and other disadvantages of the prior art.

Another object is to provide an improved moisture measurement system possessing enhanced versalility by virtue of an extended range of accurate dielectric power loss measurement.

A further object of the invention is the provision of a new and improved single moisture measurement system which is readily adapted and calibrated for registering moisture content variation in a large variety of different materials.

Still another object is to provide a new and improved electronic moisture measuring device of compact design characterized by relatively low cost and ease of operation.

Yet another object of the present invention is the provision of a moisture measurement system possessing high sensitivity and accuracy over a wide range of dielectric dissipation factors, while remaining relatively insensitive to variations in capacitance.

A still further object is to provide a moisture measurement system whose indicating circuit is adaptable to suppressed zero and sample comparator operations, while being readily returnable to the normal measurement state.

Still another object of the invention is to provide a moisture measurement system which is relatively unaffected by power supply voltage variations.

The above and other objects and advantages of this invention will be better understood by reference to the following detailed description when considered in connection with the accompanying drawing of an illustrative embodiment thereof, wherein:

FIG. 1 is an electrical schematic diagram for describing the electronic phenomenon by which dielectric power loss of a test sample may be correlated with sample moisture content;

FIG. 2 is a block diagram illustrating the general arrangement of the moisture measurement system of the present invention;

FIG. 3 is an electrical circuit diagram of a preferred embodiment of the moisture measurement system depicted generally in FIG. 2; and FIG. 4 is a plot of the current vs. voltage characteristics of a tunnel diode employed in the power regulation and low voltage cut-out circuitry of the moisture measurement system.

Referring now to the drawing, and particularly to FIG. 1 thereof, there is shown the equivalent circuit of a test material engaged by the coupling electrodes of an instrument designed to sense moisture content variation as a function of the changes in dielectric dissipation factor or power loss of the sample being tested. If a capacitor, i.e., a pair of coupling electrodes, is constructed of two sets of electrically conductive elements, and a dielectric material, i.e., the test sample, intercepts the electric field between the conductive elements, the resultant equivalent circuit appears as a capacitance $C_x$ in parallel with a resistance $R_x$, substantially as shown in FIG. 1.

The equivalent resistance $R_x$ is inversely proportional to the dissipation factor and the dielectric constant of the material being tested and, since the dissipation factor is directly proportional to the moisture content of the material, it follows that the resistance $R_x$ will vary in inverse proportion with the moisture content of the sample. Hence, the equivalent resistance parameter $R_x$ provides a convenient medium for ascertaining moisture content variations if the resistance $R_x$ is embodied as the load for an appropriate electronic indicating circuit.

Of course, different materials have different dielectric constants and dissipation factors. Moreover, variations in moisture content of different materials will effect changes of varying magnitude in the dielectric constant and dissipation factors of these materials. Therefore, it is apparent that a general purpose moisture measurement instrument must be capable of providing accurate measurements over a wide range of varying dielectric parameters if more than one type of material is to be tested with a single instrument.

The moisture measuring system of the present invention is of the type in which the resistive parameter $R_x$ of the test material is employed as a power absorbing load for an electronic oscillator. Electrical power is absorbed from the oscillator by virtue of the dielectric loss in the test sample, and this power absorption is measured by means of the change in electrical current requirements of the oscillator. The latter change in oscillator current may be correlated with moisture content variation in the material being tested and exhibited upon an appropriate scale in an indicating circuit.

Referring now to FIG. 2, there is shown a general block diagram schematic of a moisture measurement system in accordance with the present invention.

Basically, an appropriate coupling network, which may be in the form of test sample coupling electrodes 10, is used to connect the test material into the output circuit of an oscillator 11. In accordance with the invention, the sensitivity of the oscillator 11 to dielectric power loss loading by the test sample is adjustable by a novel range loading sensitivity control 12. A deck of range calibration standards 13 is also adapted to be selectively connected into the oscillator output circuit by means of a switch 14.

The arrangement of electronic elements and subsections 11–14 permits the measurement system to be readily adapted for accurately registering the dielectric power loss of a number of test materials having widely varying dielectric power loss characteristics. In this regard, the range loading sensitivity control 12 permits a reduction in sensitivity for very lossy materials, to prevent overloading saturation of the oscillator 11. On the other hand, the sensitivity control 12 may be adjusted to increase the sensitivity of the oscillator 11 to loss loading by test materials exhibiting extremely low dielectric power losses.

The range calibration standard section 13 provides a plurality of standard losses which may be employed in lieu of a test sample. By insertion of such known losses, the measurement system may be accurately calibrated for any given load sensitivity provided by the range loading sensitivity control 12.

A signal indicative of the degree of loading of the oscillator 11 by the test sample is derived from the oscillator and directed as input to a first half of a differential amplifier 15. A second half of a differential amplifier 16 receives as input a reference voltage from a novel power regulation and low voltage cut-out circuit 17.

The differential output from the differential amplifier 15, 16 is directed to an indicating circuit 18 which may be appropriately scaled to indicate relative dielectric power loss or test sample moisture content, absolute dielectric power loss or test sample moisture content, or it may be scaled to read in any arbitrary units.

A range sensitivity adjustments section 19 is employed to provide fine sensitivity adjustment control of the indicating circuit 18. The adjustments section 19 is used in conjunction with the range calibration standards section 13 at each of the various oscillator loading sensitivities provided by the range control 12. In this regard, the range sensitivity adjustments section 19, the range loading sensitivity control 12, and the range calibration standards section 13 are all ganged together so that, upon selection of a given loading sensitivity by the control 12, the appropriate range sensitivity adjustment for the indicating circuit 18 and proper calibration standard will automatically be selected for insertion into the measuring system.

A power supply 21 is employed to provide the reference voltage for the differential amplifier 16 and all necessary operating power to the remaining electrical components in the measurement system. The power supply 21 is preferably of the rechargeable battery type and, in this connection, the system is provided with a recharging circuit 22.

The application of electrical power from the power supply 21 to the remaining portions of the electrical measurement system is controlled by a power on-off switch 23 and a power regulation and cut-out section 17. This latter section 17 regulates the voltage output of the power supply and automatically interrupts the flow of power to the moisture measurement portion of the electrical system when the voltage output of the power supply 21 drops to a level indicating the need for recharging.

Referring now particularly to FIG. 3 of the drawing, there is shown an electronic circuit illustrating a preferred embodiment of the generalized measurement system of FIG. 2.

As will be apparent from FIG. 3, the electrical circuit is transistorized to reduce the electrical power requirements imposed upon the power supply 21 and to produce a more compact and reliable instrument.

The test sample coupling electrodes 10 may be any type of capacitative elements adapted to contact the test material and insert the latter as a dielectric medium between the capacitative elements. Such electrodes 10 are usually fabricated of copper, brass, or other electrically conductive material, and are preferably of the "button" variety, such as that taught in U.S. Patent No. 2,692,972, issued October 26, 1954, to Albert K. Edgerton and Marvin L. McBrayer, for High Frequency Moisture Register with Button-Type Electrode.

The oscillator 11 in the circuitry of FIG. 3 employs a transistor 25, connected to a tank capacitor 26 and an inductance 27, in the Hartley-type oscillator configuration. The transistor 25 may be of the general type known as 2N710, and the resonant tank circuit formed by the capacitor 26 in parallel with the inductance 27 is connected between the collector electrode 28 and the base electrode 29 of the transistor. A self-biasing arrangement is used to bias the base electrode 29, and this biasing circuit may typically comprise a 150 $\mu\mu$f. capacitor 31 and parallel 270 K$\omega$ resistor 32 connected between the base electrode and the resonant tank circuit of the oscillator 11.

The oscillator 11 is preferably operated in the Class C mode and is biased so that changes in the "Q" of the resonant tank circuit will cause variations in the electrical current flowing through the emitter 33 of the transistor 25. In this regard, a load resistor 34, typically of 3000 ohms, is connected in series with the emitter 33 of the oscillator transistor 25, the side of the resistor opposite that connected to the emitter being connected to an internal ground 35. Variations of electrical current flowing through the emitter 33 of the transistor 25 create corresponding voltage variations across the load resistor 34. These voltage variations are then fed to an appropriate metering circuit in a manner to be hereinafter described.

The capacitative electrodes 10, used to couple the instrument to the test material, are connected in parallel with the resonant tank circuit of the oscillator 11. When a lossy material is brought into proximity with the electrodes 10, the electrostatic field 36 established between the electrodes penetrates the test material. This insertion of the test material into the electrostatic field 36 causes the equivalent $R_x$ (see FIG. 1) to appear as a shunt load across the resonant tank circuit. Hence, the Q of the tank circuit is reduced by the insertion of additional resistive impedance, and causes the oscillator 11 to increase its conduction angle in the Class C mode of operation. However, the feedback ratio of the oscillator 11 is not appreciably altered and, hence, the peak-to-peak voltage across the tank circuit remains essentially constant even with the insertion of the equivalent $R_x$ impedance.

The increased conduction angle of the oscillator 11 results in an increase of average current flowing through the collector 28 of the transistor 25, and thereby also increases the average current flowing through the emitter 33. In other words, as the resonant tank of the oscillator 11 is loaded by insertion of the equivalent $R_x$ of a test material, the oscillator attempts to oscillate at the same voltage level in the Class C mode, but draws more current to compensate for the loss loading.

It will be noted in FIG. 3 that the capacitor 26 is connected in parallel across only a portion of the inductance 27, and the latter inductance is provided with a plurality of output connection taps 37–40 to facilitate connection of the electrodes 10 across selected portions of the inductance by means of a loading sensitivity selection switch 41. This arrangement of providing tapped outputs 37–40 from the inductance 27 facilitates precise control over the loading sensitivity of the oscillator 11 to insertion of an equivalent resistance $R_x$ when a test material is contacted by the electrodes 10.

Providing tapped output portions of the inductance 27 permits an autotransformer effect to occur in reflecting the resistance $R_x$ into the resonant tank circuit of the oscillator 11. This is accomplished simply by varying the number of turns of the tank coil inductance 27 across which the electrodes 10 are connected, i.e., by varying the position of the switch 41 to couple these electrodes to one of the output taps 37–40. In this manner, sensitivity of the oscillator 11 to loss loading is readily controlled, since a very lossy substance can be made to produce a similar change in current flowing through the emitter 33 as a relatively low loss material, simply by selection of the proper output tap 37–40 on the tank circuit inductance 27.

This control over loading sensitivity results in a retention of sensitivity curve shape (power loss vs. indicating circuit dial reading) in the indicating circuit 18 for all power loss ranges, as well as providing a considerable simplification of the calibration expedients required in the indicating circuit.

As previously indicated, a major difficulty encountered with the dielectric power loss measurement systems of the prior art has been the sensitivity of such systems to variations in sample capacitance as well as dielectric power loss. To minimize this deficiency, a capacitor 42, typically of the order of 10 $\mu\mu$f., is shunted across the electrodes 10. In this manner, the initial capacitance appearing across the electrodes 10 is of sufficient magnitude to remain substantially unaltered by the relatively small changes in capacitance occurring in the test material by virtue of moisture content variations.

Since the moisture measurement system of the present invention makes provision for a plurality of oscillator loading sensitivity states, it becomes desirable to calibrate each of these oscillator sensitivity states against known power loss standards. Hence, a plurality of precision resistors 45–48 are provided, one for each of the loading sensitivity states corresponding to the tapped outputs 37–40, respectively. These calibrated power loss standards are selected by a deck switch 49 and are adapted to be individually connected in parallel across the electrodes 10. In this regard, the deck switch 49 is ganged to the loading sensitivity deck switch 41, so that the proper calibration standard is automatically connected into the circuit for the selected sensitivity state. The power loss calibration system is selectively rendered operative or inoperative by a series switch 14 for connecting the calibration system into or out of the tank and electrode circuit.

One side of the calibration standards 45–48 and the electrodes 10 is connected to an instrument case ground connection 51. Suitable ground-isolating capacitors 52, 53 are employed to isolate the oscillator 11 and the internal ground 35 from the ground connection 51. These capacitors 52, 53 are typically of .002 $\mu$f. Capacitors 54 and 55, which may also be of .002 $\mu$f., are employed as R.F. bypass networks to ground for the emitter 33 and the tank circuit of the oscillator 11.

An emitter follower differential amplifier is employed to feed the indicating circuit 18 of the electrical measurement system. This differential amplifier consists of a pair of transistors 60, 61, typically of the 2N1273 variety, with their emitters grounded through load resistors 62, 63, respectively, which may each be of the order of 1000 ohms.

The transistor 60 is directly coupled to the emitter 33 of the oscillator transistor 25. Hence, the output signal appearing across the load resistor 62 in the emitter circuit of the transistor 60 is directly proportional to the power loss indicative voltage variation appearing across the resistance 34 in the emitter circuit of the transistor 25.

The transistor 61 is connected by its base electrode to the wiper arm 65 of a potentiometer 66 in a voltage divider string which includes the potentiometers 66 and 67 in series with the fixed resistances 68 and 69. The voltage divider string formed by the resistances 66–69 forms a zero-setting network for the indicating circuit 18.

The indicating circuit 18 is connected between the emitter follower connected transistors 60, 61 to receive the difference in output voltages appearing across the load resistances 62, 63, respectively.

The indicating circuit 18 comprises a galvanometer 70, i.e., of 0–200 microampere range, connected in series with a plurality of resistive calibration standards 71–74 which are individually selected by means of a deck switch 75. The deck switch 75 is ganged, in the same manner as the switch 49 for the power loss standards 45–48 is ganged, to the oscillator loading sensitivity selection switch 41, so that the appropriate one of the calibrating resistances 71–74 is always connected in series with the meter 70 for the specific oscillator loading sensitivity in effect.

A thermistor 76, i.e., one whose resistance varies inversely with temperature, is connected in series with a resistor 77, typically of 390 ohms resistance for a 200 $\mu$a. meter, and this series resistance combination is connected in parallel with the meter 70. The reason for such temperature compensation is to offset the increase in loading sensitivity of the oscillator 11 with increasing temperatures.

The power supply 21 preferably embodies a rechargeable battery, of the nickel-cadmium variety or the like. The power regulation and low voltage cut-out circuit 17 includes a current limiting resistor 80 in series with a Zener diode 81, typically of the 1N714 variety, and a tunnel diode 82 which may be of the 1N2940 type. By virtue of the reverse bias characteristics of the Zener diode 81 and the relatively low voltage appearing across the tunnel diode 82, the voltage drop across the series-connected pair of diodes 81, 82 is essentially constant. This voltage is directed as input to an emitter follower transistor amplifier 83 whose output is a constant reference and supply voltage for use by the remaining portions of the measuring system.

The voltage across the tunnel diode 82 is employed as bias through a resistor 85, typically of 2200 ohms, for a transistor switch 84. The transistor amplifier 83 and transistor switch 84 may use transistors of the 2N1273 variety.

Referring to FIG. 4, it will be noted that the tunnel diode 82 has two stable states of operation separated by the negative slope region between the peak and trough points 92 and 93, respectively. In normal operation, the diode 82 is operated in the second stable state above the operating point 91.

If the circuitry is allowed to remain in operation constantly, and a dropping battery voltage level causes the current through the tunnel diode 82 to fall below the peak current level, denoted generally by the number 90, the operating point will shift below the forward operating point 91 in the second stable state until the trough point 93 is reached, at which point operation will suddenly shift to the first stable state. Moreover, if the circuitry is operated intermittently rather than continuously, intermittent operation being more common in actual practice, and the battery voltage level is such that the current through the tunnel diode is at or less than the peak current level 90, any momentary interruption of circuit operation will cause the diode to shift suddenly from the second stable state to the first stable state, i.e., from operating point 91 to operating point 92, or from operating point 94 to operating point 95, etc.

The aforedescribed shift from the second stable state to the first stable state of the tunnel diode 82 results in a sharp drop in forward bias voltage across the diode. Typically, the peak current level of the tunnel diode 82 may be of the order of 1.0 ma. in magnitude, and the voltage drop across the diode may shift from approximately 0.5 volt just above the peak current level in the second stable state to approximately 0.05 volt just below the peak level in the first stable state. This sharp change in voltage across the diode 82 is sufficient to shift the transistor switch 84 from the saturation state to the open state. Hence, the supply of electrical power from the battery source 21 to remaining portions of the electronic measuring system may be interrupted when the current flowing through the tunnel diode 82 drops below the diode peak level current. By careful selection of the value of the resistance 80, which may be 470 ohms, this will occur only when the battery source 21 drops to a voltage level which indicates that it is in need of recharging.

The performance life of the battery 21 may be significantly enhanced by cessation of power drain, and performance of the indicated recharging operation, when the voltage level of the battery has dropped to a point where continued use would prove harmful to the battery. Hence, the tunnel diode 82 and transistor switch 84 provide an effective low voltage cut-out system. This arrangement renders the moisture measuring system inoperative until the battery 21 is recharged to its proper voltage level.

The recharging circuit 22 is essentialy operated by connecting a supplementary source of electrical power, i.e., 115 volts A.C., across a voltage dividing network. The voltage dividing network is employed in lieu of a transformer because of the former's cost, greater compactness and ease of maintenance. A portion of the voltage appearing across the dividing network is then rectified and directed to the battery source 21 to recharge the latter. The voltage dividing network typically comprises a capacitor 97 in series with a resistor 98. This voltage dividing arangement, employing a capacitance in series with a resistance, minimizes heat generation in the voltage dividing network, since the capacitor 97 absorbs essentially no power but effects only a change in phase.

The rectifying network comprises essentially a current-limiting impedance, in the form of a resistor 99, in series with a semi-conductor diode 96. A simple, unfiltered half wave rectifier is thus provided for recharging the battery 21, whereas the novel voltage divider arrangement provides a low cost means for coupling to the supplementary source of electrical power without necessitating the use of a relatively expensive transformer.

In operation, the meter 70 of the indicating circuit 18 is first set to its zero reading for an essentially zero power loss state. This is accomplished with no test material in contact with the electrodes 10, and with no power loss calibration standards 45-48 shunting the resonant tank circuit of the oscillator 11. Hence, the condition is essentially one with no current flowing through the meter 70. For this case, the wiper arm 65 is centered upon the zero-setting potentiometer 66. The magnitude of the series resistance 67 is then adjusted to produce a zero indication upon the scale of the meter 70.

Once having accomplished this initial zero-setting calibration step, the electrical system must then be calibrated for each of the oscillator loading sensitivity states or ranges represented by the output taps 37-40, respectively, on the tank inductance 27. This is accomplished by setting the ganged switches 41, 49, 75 to each of the range positions 1-4 and performing a fine adjustment calibration of the meter 70 for each of these ranges individually.

The fine adjustment of the meter 70 is accomplished by switching in the calibration standards 45-48, by means of the switch 14, the appropriate calibration resistance being automatically connected across the electrodes 10 for the specific sensitivity state selected by the switch 41. Since each of the calibration resistances 45-48 represents a known power loss, the appropriate impedances 71-74, for each of the range positions 1-4 of the deck switch 75, are adjusted to provide the proper scale indication upon the meter 70 for the known power loss. Hence, the calibration resistances 71-74 permit the indicating circuit 18 to be compensated for differences in transistor gain, component aging, or misalignment of the tapped output connections 37-40 upon the tank circuit inductance 27. It will be apparent, therefore, that the sensitivity of the meter 70 for all ranges is automatically adjusted by the range calibration resistances 71-74 to compensate for tolerance errors and variations in circuit components.

In making moisture measurements upon test materials, the electrodes 10 are first placed in contact with a sample of dry material or a sample of material having an acceptable moisture content. This sample is used as a standard for the specific type of material being tested. With the standard in position against the electrodes 10, the wiper arm 65 of the zero-setting potentiometer 66 may be adjusted to give any desired scale reading upon the meter 70. In this manner, other samples of the same material may be compared with the established standard scale indication for that material, to ascertain whether or not such subsequent samples are within a specified range of acceptability. Hence, comparison readings for the moisture content of test samples with respect to an acceptable standard may be readily made with the measurement system of the present invention.

If desired, of course, the calibrated power losses 45-48 may be used as standards, and the meter 70 will then provide absolute readings of test sample moisture content percentage if the meter is provided with an appropriate scale for the test material.

The arrangement of the present invention also facilitates "suppressed zero" operation. This method is employed where the dry or standard material has a high dielectric power loss for reasons other than the presence or absence of moisture. In such instances, where the standard would provide an inordinately high scale reading, the zero-setting potentiometer 66 is adjusted to make the scale of the meter 70 indicate below zero in the absence of any test material (hence the term "suppressed zero") and to indicate zero, or some selected reference point above zero, only when the acceptable standard is in contact with the electrodes 10.

It should be noted, however, that regardless of the type of measurement performed, i.e., absolute, comparison, or suppressed zero variety, the indicating circuit is always readily returned to its normal calibration state by operating the switch 14 to connect the appropriate calibration standard 45–48 into the circuit, and adjusting the zero-setting potentiometer 66 to cause the meter 70 to indicate the appropriate power loss.

The moisture measurement system of the present invention satisfies a long existing need in the instrumentation field for a compact, low cost, accurate moisture measuring device in a single unit of sufficient versatility as to be applicable to moisture measurement over a wide range and for a large class of different materials. Moreover, the moisture measurement system of the present invention is characterized by long life, ease of maintenance, and simplicity of operation.

It will be apparent from the foregoing that, while a particular form of my invention has been illustrated and described, various modifications can be made without departing from the spirit and scope of my invention. Accordingly, I do not intend that my invention be limited, except as by the appended claims.

I claim:
1. Apparatus for measuring the moisture content of a test material, comprising:
   a Class C electronic oscillator including an inductance and a capacitance electrically interconnected into a resonant tank circuit, said tank circuit being coupled to a transistor, said inductance having a plurality of tapped autotransformer output connections;
   capacitive electrode means and switching means for connecting a test material across selected pairs of said plurality of tapped autotransformer output connections to vary the power loading of said oscillator and the electrical current passing through said transistor;
   a supplementary capacitance connected across said selected of said tapped output connections of said inductance, the magnitude of said supplementary capacitance being sufficiently great to minimize the sensitivity of said oscillator to capacitance variations in said test material;
   sensing means for deriving a signal indicative of the magnitude of said current passing through said transistor;
   indicating means electrically connected to said sensing means for registering the moisture content of said test material as a function of the current passing through said transistor; and
   means for automatically varying the sensitivity of said indicating means to correspond to the particular tapped output connections across which said electrode means are connected.

2. In a system for measuring the dielectric power loss of a sample under test, the combination comprising:
   Class C oscillator means including an electronic amplifying device connected to a resonant tank circuit, said resonant tank circuit including a tank capacitance connected in parallel with an inductance of fixed value, said inductance having a plurality of tapped output connections;
   capacitive electrode means for coupling a test sample to said tank circuit to power load said oscillator means and thereby vary the average electron current flowing through said amplifying device as a function of the dielectric loss of said test sample;
   switching means connected between said electrode means and said plurality of tapped output connections of said inductance for selectively varying the magnitude of the test sample impedance reflected into said tank circuit via said inductance; and
   means responsive to the average electrical current flowing through said oscillator means to produce a physical indication in proportion to the magnitude thereof.

3. Apparatus for measuring the moisture content of a test material, comprising:
   at least one pair of capacitive electrodes adapted to contact said test material and thereby employ said material as a dielectric medium between said electrodes;
   an oscillator including a transistor electrically connected to a resonant tank circuit, said tank circuit including a capacitance electrically connected in parallel with an inductance, said inductance having a plurality of output taps;
   means to selectively connect said capacitive electrodes across pairs of said output taps;
   a plurality of resistive impedance elements for insertion as power absorbing loads of known value;
   means to selectively shunt selected ones of said impedance elements across selected pairs of said output taps;
   a first transistor output amplifier for deriving a signal proportional to the current drawn by said transistor oscillator and producing an output voltage in proportion thereto;
   a second transistor output amplifier for producing a reference output voltage;
   a meter indicating circuit electrically connected between said first and said second transistor output amplifiers to receive their differential output voltage;
   a plurality of variable impedance elements; and
   means for automatically connecting a particular one of said variable impedance elements in series with said meter indicating circuit to correspond to the particular output taps across which said electrodes are connected.

4. The moisture measuring apparatus set forth in claim 3, wherein said capacitance is electrically connected across only a portion of said inductance, whereby said inductance is rendered capable of autotransformer action in reflecting loss impedances of test materials into said tank circuit.

5. Apparatus for registering the dielectric power loss of a test material, comprising:
   oscillator means including a resonant tank circuit;
   means for connecting a test material to said tank circuit;
   means for varying the sensitivity of said tank circuit to loading by a test material;
   differential amplifier means for comparing a voltage proportional to the current drawn by said oscillator means with a reference voltage;
   indicating means electrically connected across and responsive to the output from said differential amplifier;
   a battery source of electrical power;
   a Zener diode and a tunnel diode conencted in series across said battery source, the voltage across said Zener diode and tunnel diode being applied to a transistor amplifier, the output from said transistor amplifier being a source for said reference voltage and electrical power for said oscillator means and said differential amplifier, the voltage across said tunnel diode being applied as bias to a transistor switch having a saturation state and a cut-off state, said transistor switch being capable of interrupting the flow of electrical power to said oscillator means and said differential amplifier; and
   means for selectively recharging said battery source.

6. Apparatus as set forth in claim 5, wherein said means for recharging said battery source includes connection means for a supplementary source of electrical power, a capacitor and a resistance in series across said connection means as a voltage dividing network, and current-limited rectifying means connecting said battery source across the resistance portion of said voltage dividing network.

7. In an apparatus for measuring the moisture content of a test material, the combination comprising:
   a plurality of capacitive electrodes adapted to engage said test material and thereby insert said test material as a dielectric medium between said electrodes;

oscillator means including a transistor electrically coupled to a resonant tank circuit in a Hartley oscillator configuration, said tank circuit including a capacitance connected in parallel with a portion of an inductance, said portion of said inductance being less than the whole of said inductance, said inductance having a plurality of tapped output portions;

loading sensitivity selection means for selectively connecting said electrodes across a selected one of said tapped ouput portions of said inductance;

a plurality of calibration resistances;

means for selectively connecting a particular one of said resistances across said electrodes;

a pair of transistor amplifiers forming a differential amplifier, one of said amplifiers of said pair receiving as input a signal proportional to the current being drawn through the emitter circuit of the oscillator transistor, the other of said transistor amplifiers of said pair receiving as input a calibrating voltage signal;

an indicating circuit electrically connected to receive the differential output from said differential amplifier;

a plurality of calibration and temperature-compensating impedance elements in said indicating circuit;

a rechargeable battery source for supplying electrical power;

means for regulating the voltage output from said battery source;

tunnel diode means responsive to the state of charge of said rechargeable battery to interrupt the flow of electrical power from said battery source when said source is in need of recharging; and means connected to said battery source for selectively recharging said battery source.

8. Apparatus as set forth in claim 7, including transistor biasing means for causing said oscillator means to perform in the Class C mode.

9. In a system for measuring the dielectric power loss of a test material, the combination comprising:

a transistor oscillator including a resonant tank circuit;

capacitive means for coupling a test material across said tank circuit to vary the power loading of said oscillator;

a pair of transistor amplifiers forming a differential amplifier, one of said pair of amplifiers receiving as input a signal proportional to the current passing through said transistor oscillator, the other of said pair of transistor amplifiers receiving as input a reference voltage signal;

indicating means electrically connected to receive the differential output from said differential amplifier;

a source of electrical power connected to supply said transistor oscillator, said transistor amplifiers, and said reference voltage;

a normally closed transistor switch in series with said source of electrical power; and a tunnel diode connected across said source, said tunnel diode being connected to said transistor switch to bias said transistor switch to saturation when said source is at a normal voltage level, said tunnel diode biasing said transistor switch to cut-off when said source falls below a prescribed voltage level.

References Cited by the Examiner

UNITED STATES PATENTS

| 2,531,312 | 11/1950 | Van Soon | 331—169 |
| 2,772,393 | 11/1956 | Davis | 324—40 |
| 2,993,171 | 7/1961 | Kelsey | 324—123 X |
| 3,046,479 | 7/1962 | Mead et al. | 324—61 |
| 3,118,137 | 1/1964 | Vincent | 324—29.5 X |
| 3,174,094 | 3/1965 | Farnsworth et al. | 323—18 |

WALTER L. CARLSON, *Primary Examiner.*

CLAUDE A. S. HAMRICK, EDWARD E. KUBASIEWICZ, *Assistant Examiners.*